(12) United States Patent
Rothschild et al.

(10) Patent No.: US 8,788,361 B2
(45) Date of Patent: *Jul. 22, 2014

(54) SYSTEMS AND METHODS FOR MANAGING RIGHTS TO BROADBAND CONTENT (71) Applicant: Cox Communications, Inc., Atlanta, GA (US)

(72) Inventors: Keith Alan Rothschild, Atlanta, GA (US); Julius Bert Bagley, Lawrenceville, GA (US); Muhammad Asif Raza, Norcross, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/888,984

(22) Filed: May 7, 2013

(65) Prior Publication Data
US 2013/0247225 A1 Sep. 19, 2013

Related U.S. Application Data (63) Continuation of application No. 12/856,006, filed on Aug. 13, 2010, now Pat. No. 8,458,040.

(51) Int. Cl.
G06Q 30/00 (2012.01)
(52) U.S. Cl.
USPC .......................................................... 705/26.1
(58) Field of Classification Search
CPC .......................................... G06Q 30/06–30/08
USPC ................................................. 705/26.1–27.2
See application file for complete search history.

(56) References Cited

U.S. PATENT DOCUMENTS

| | | | |
|---|---|---|---|
| 7,818,260 B2 | 10/2010 | Stevens | |
| 8,458,040 B2 * | 6/2013 | Rothschild et al. | 705/26.1 |
| 2001/0019559 A1 | 9/2001 | Handler et al. | |
| 2002/0054087 A1 | 5/2002 | Noll et al. | |
| 2004/0139207 A1 * | 7/2004 | de Jong | 709/229 |
| 2004/0168184 A1 | 8/2004 | Steenkamp et al. | |
| 2004/0261094 A1 | 12/2004 | Huslak et al. | |
| 2005/0021467 A1 | 1/2005 | Franzdonk | |
| 2005/0066353 A1 | 3/2005 | Fransdonk | |
| 2005/0132295 A1 | 6/2005 | Noll et al. | |
| 2006/0107286 A1 | 5/2006 | Connor et al. | |
| 2007/0083475 A1 | 4/2007 | Stevens | |

(Continued)

OTHER PUBLICATIONS

Bohner, D., "Digital Rights Description as Part of Digital Rights Management; A Challenge for Libraries" (Library Hi Tech, vol. 26, No. 4, pp. 598-605, 2008).*

Primary Examiner — Ethan D Civan
(74) Attorney, Agent, or Firm — Sutherland Asbill & Brennan LLP (57) ABSTRACT Systems and methods for managing rights to broadband content are provided. A request for broadband content may be received by a server. The received request may include a client identifier associated with a customer device from which the request is received and a content identifier associated with the requested broadband content. Based at least in part upon the client identifier, a billing account associated with the customer device may be identified, and one or more users associated with the billing account may be identified. A set of access rights for the one or more users may be determined and, based upon an analysis of the set of access rights, a determination may be made as to whether access to the broadband content is authorized.

20 Claims, 5 Drawing Sheets

(56) References Cited

U.S. PATENT DOCUMENTS

| | | | |
|---|---|---|---|
| 2007/0204290 A1* | 8/2007 | Li | 725/31 |
| 2008/0141137 A1* | 6/2008 | Cleary et al. | 715/733 |
| 2010/0125875 A1 | 5/2010 | Hays et al. | |
| 2010/0142712 A1 | 6/2010 | Tang et al. | |
| 2010/0246582 A1 | 9/2010 | Salinger et al. | |
| 2012/0041829 A1 | 2/2012 | Rothschild et al. | |

\* cited by examiner

SYSTEMS AND METHODS FOR MANAGING RIGHTS TO BROADBAND CONTENT

RELATED APPLICATION

The present application is a continuation of U.S. patent application Ser. No. 12/856,006, filed on Aug. 13, 2010, the disclosure of which is incorporated herein by reference in its entirety.

FIELD OF THE INVENTION

Aspects of the invention relate generally to broadband content, and more particularly, to the management of access rights to broadband content.

BACKGROUND OF THE INVENTION

Digital rights management ("DRM") is utilized to control access to a wide variety of digital content, such as video and/or audio content. Typically, a content provider either directly or indirectly controls access rights management for its digital content utilizing a rights locker. Content providers maintain rights lockers that include access information that is tied to various users or customers that have rights to access digital content of the content provider. When a user desires access to certain digital content, a rights locker is searched for a user profile or user account with the content provider, and a determination is made whether to grant access to the requested digital content based upon the accessed user account.

DRM solutions often present problems between content providers and service providers, such as content distribution networks (e.g., cable networks, satellite television networks, etc.) or other media or content distribution systems. Content providers that generate and/or provide content (e.g., audio-visual content, text-based content, non-text-based content, graphic content, software applications, etc.) to distribution network operators desire to protect the content and limit the use and/or distribution of the content to authorized use and/or distribution. Similarly, service providers that distribute content or otherwise facilitate the distribution of content to consumers desire to avoid responsibility for downstream unauthorized uses. However, a service provider may have difficulty in mapping its customers to the user accounts stored in rights lockers maintained by the content providers. Typically, a service provider tracks customers using billing accounts, and multiple users may be tied to a billing account. In turn, any number of rights accounts may be maintained in various rights lockers for the different users. Based at least in part upon the disconnect between service provider billing accounts and user rights accounts, content providers and service providers often struggle with providing a superior DRM solution to distributed content.

Accordingly, improved systems and methods for managing rights to broadband content are desirable.

BRIEF DESCRIPTION OF THE INVENTION

Some or all of the above needs and/or problems may be addressed by certain embodiments of the invention. Embodiments of the invention may include systems and methods for managing rights to broadband content. In one embodiment, a method for managing rights to broadband content may be provided. A request for broadband content may be received from a customer device by a server or other rights management system, such as a server comprising one or more computers. The received request may include a client identifier associated with the customer device and a content identifier associated with the requested broadband content. Based at least in part upon the client identifier, a billing account associated with the customer device may be identified. One or more users associated with the billing account may then be identified, and a set of access rights for the one or more users may be determined. Based upon an analysis of the set of access rights, a determination may be made as to whether access to the broadband content is authorized.

In accordance with another embodiment of the invention, a system for managing rights to broadband may be provided. The system may include at least one communications interface and at least one processor. The at least one communications interface may be configured to receive, from a customer device, a request for broadband content, the request including a client identifier associated with the customer device and a content identifier associated with the requested broadband content. The at least one processor may be configured to (i) identify, based upon the client identifier, a billing account associated with the customer device, (ii) identify one or more users associated with the billing account, (iii) determine a set of access rights for the one or more users, and (iv) determine, based upon an analysis of the set of access rights, whether access to the broadband content is authorized.

Additional systems, methods, apparatus, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may include systems and methods for managing rights, such as access rights, to various broadband and/or digital content. For purposes of this disclosure, the term "broadband content" may be utilized to refer to any content for which access rights may be utilized to control access to the content. According to an aspect of the invention, an arbitration system or an arbitration processing module or processing component may be associated with a service provider, such as a cable service provider, satellite service provider, Internet Protocol ("IP") content provider, a digital media host, or other service provider that distributes content to consumers or customers via a suitable content distribution network. In certain embodiments, the arbitration system may receive a customer request for desired broadband content (e.g., desired video content, desired audio content, etc.), and the arbitration system may determine whether access to the desired content should be authorized. In doing so, the arbitration system may analyze access rights for any number of users that are associated with a billing account or other customer account with the service provider.

In one example embodiment, a request for desired content may include a client identifier of a customer device that is utilized to submit the request (e.g., an identifier of a set-top box, mobile device, etc.) and/or an identifier of the desired content. The arbitration system may utilize the client identifier to determine or identify a billing account associated with the customer device. The arbitration system may then identify one or more users that are associated with the identified billing account. Once the one or more users have been identified, the arbitration system may determine or identify access rights for each of the users. For example, the arbitration system may identify one or more rights locker accounts with various content providers that are associated with each of the users, and the arbitration system may determine user access rights for each of the rights locker accounts. As one example, a request for access rights information for a user account may be communicated to a rights locker, and access rights information for the user account may be determined based upon a received reply. As desired, received access rights information may be stored by the arbitration system.

Once access rights information has been determined and/or assembled for each of the users associated with a billing account, the arbitration system may analyze the access rights information in order to determine whether access to the desired content is authorized. In certain embodiments, a determination may be made as to whether all of the users that are associated with a billing account are authorized to access the desired content. If it is determined that all of the identified users are authorized to access the content, then the customer device may be permitted to access the requested content. If, however, it is determined that at least one user is not authorized to access the content, then a determination may be made as to which users are authorized to access the content. A request for user identification information and/or access credentials or other authentication information may then be communicated to the customer device in order to identify the requesting user. User identification and/or authentication information may then be returned to the arbitration system and validated. Alternatively, user identification and/or authentication information included in the received content request may be analyzed. Based upon the analysis and/or validation of identification and/or authentication information, a requesting user may be identified. A determination may then be made as to whether the requesting user is authorized to access the desired content. Additionally, as desired, the arbitration system may determine whether the customer device is capable of and/or permitted to be utilized to access the desired content.

According to an aspect of the invention, if no users are eligible to access the desired content and/or if a requesting user is not authorized to access the desired content, the arbitration system may facilitate and/or direct the communication of an offer to the customer device that facilitates a purchase of the desired content. Based upon a received response to an offer, a determination may be made as to whether the user desired to purchase access to the desired content. If the user desires to purchase access, the arbitration system may facilitate the completion of a purchase transaction for the desired content and/or the update of a rights locker account for the user that is associated with the content provider. The customer device may then be granted access to the desired content.

System Overview

An example system 100 for managing rights to broadband content will now be described illustratively with respect to FIG. 1. The system 100 may include, for example, an arbitration system 105, one or more customer devices 110 or client devices, a session resource management system 115, an identity management system 120, a billing system 125, any number of rights lockers 130 and/or rights locker management systems that are associated with any number of content providers 135, one or more storage/streamer systems 140, and/or an offer management system 145. As desired, one or more components of the system 100 may be processor-driven components or devices. Additionally, in certain embodiments, certain components of the system 100 may be combined. For example, a single processor-driven component may function as the arbitration system 105, identity management system 120, billing system 125, and/or offer management system 145.

As desired, one or more of the aforementioned systems or system components can be embodied as any number of processor-driven devices, such as a server computer, a personal computer, a minicomputer, a digital tablet, and the like. As such, each component may include any number of processors, memory devices, input/output ("I/O") interfaces, and/or network interfaces. A memory may store data and/or various program logic, such as computer-executable or computer-implemented instructions that may be executed by one or more processors. Accordingly, each component may include one or more processing components configured for accessing and reading associated computer-readable media having data stored thereon and/or computer-executable instructions for implementing the various methods described herein. By executing computer-executable instructions, each of these computer systems may form a special purpose computer or a particular machine. As used herein, the term "computer-readable medium" may describe any form of computer memory or memory device.

Figure 1:
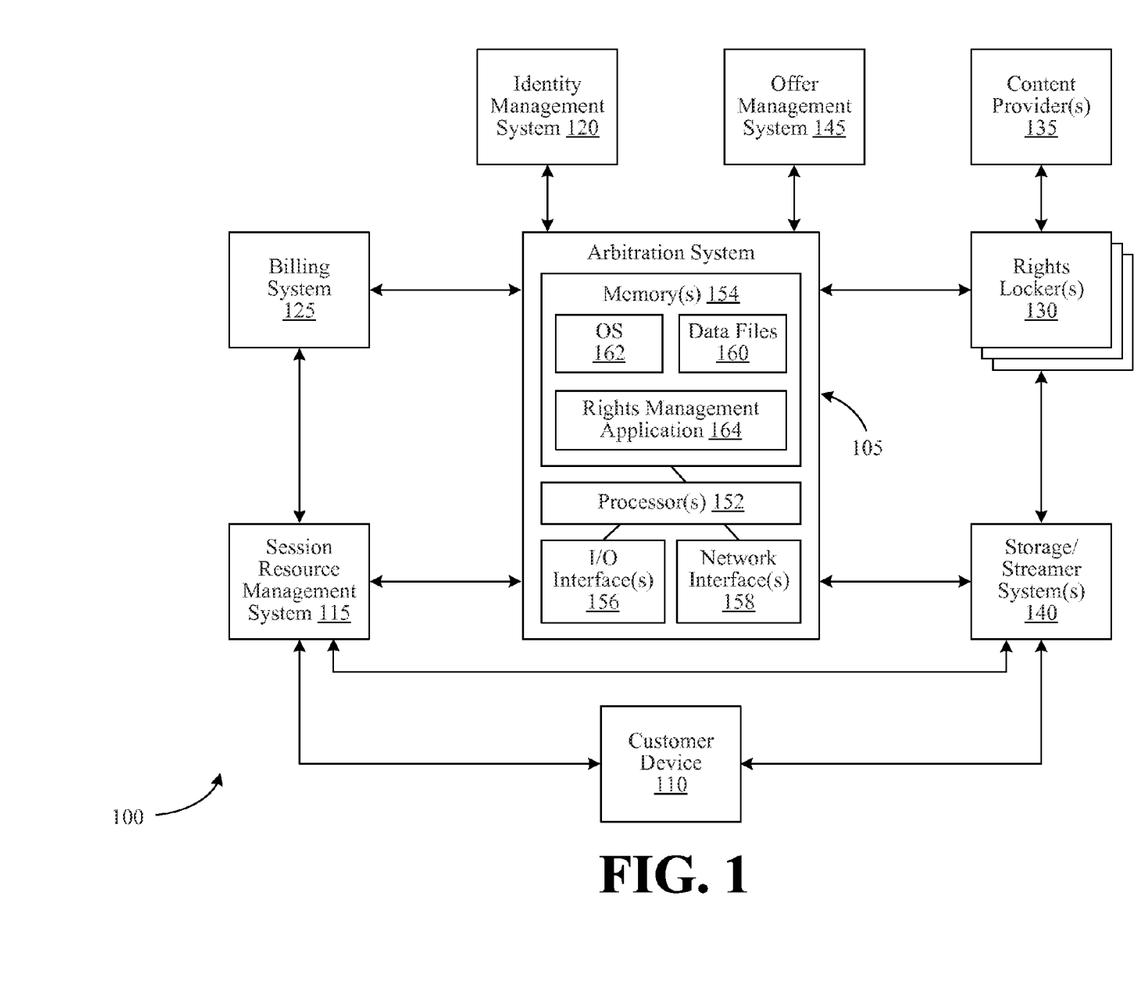
FIG. 1 illustrates a block diagram of an example system that may be utilized to manage rights to broadband content, according to an example embodiment of the invention.

With reference to FIG. 1, the arbitration system 105 may be a suitable device server, or other component that facilitates the receipt and processing of requests to access various broadband content, such as various digital content. The arbitration system 105 may be associated with an underlying service provider, such as a cable service provider, satellite service provider, or other service provider. The arbitration system 105 may be a suitable processor-driven device that is configured to execute computer-readable, computer-implemented, or computer-executable instructions. For example, the arbitration system 105 may include one or more server computers, personal computers, digital assistants, personal digital assistants, digital tablets, Internet appliances, application-specific circuits, microcontrollers, minicomputers, or other processor-based devices. The execution of suitable computer-implemented instructions by the arbitration system 105 may form a special purpose computer or other particular machine that is operable to facilitate the receipt and processing of content requests. Although a single arbitration system 105 is illustrated, the operations and/or control of the arbitration system 105 may be distributed among any number of devices, computers, and/or processing components.

In addition to having one or more processors 152, the arbitration system 105 may include one or more memory devices 154, one or more input/output ("I/O") interfaces 156, and/or one or more network interfaces 158. The processor(s) 152 may be configured to execute any number of software applications and/or computer-readable or computer-executable instructions. The memory devices 154 may include any number of suitable memory devices, such as caches, read-only memory devices, random access memory devices, magnetic storage devices, etc. The memory devices 154 may store data, executable instructions, and/or various program modules utilized by the processor(s) 152. Examples of data that may be stored by the memory devices 154 include data files 160 and/or any number of suitable program modules that may be executed by the processor(s) 152, such as an operating system ("OS") 162 and/or a rights management application 164. The data files 160 may include any suitable data that facilitates the operation of the arbitration system 105, the receipt of content requests, and/or the processing of content requests. For example, the data files 160 may include, but are not limited to, information that facilitates communication with other components of the system 100, information that facilitates the determination and/or assembly of access rights, information that facilitates a determination of access requirements for requested content, and/or information that facilitates a determination of whether access should be granted for requested content.

The OS 162 may be a suitable software module that controls the general operation of the arbitration system 105. The OS 162 may also facilitate the execution of other software modules, for example, the rights management application 164. As desired, the arbitration system 105 may additionally include one or more host modules that facilitate the establishment of a communications session with one or more customer devices, such as mobile devices associated with customers. In this regard, the arbitration system 105 may receive one or more content requests directly from a customer device. For example, a host module may be configured to establish a communications session with a Web-enabled customer device, and a request for content may be received via an established communications session.

The rights management application 164 may be a suitable software module or software application that is configured to receive information associated with a content request, determine applicable access rights associated with a customer device 110 and/or a customer account, and/or determine whether access to the requested content should be granted. In operation, the arbitration system 105 and/or the rights management application 164 may receive a request for content that is submitted by a customer device utilizing any number of suitable networks, such as a cable network or a satellite network. For example, a customer device 110 (e.g., a set-top box, etc.) may be configured to communicate a request as part of an upstream communication to a service provider head end (e.g., a cable provider head end). The request may be received by the session resource management system 115 and provided to the arbitration system 105. As another example, a customer device (e.g., a mobile device, a Web-enabled device, etc.) may communicate a content request to an arbitration system via a wide area network (e.g., the Internet).

Once a content request has been received, the rights management application 164 may identify a customer account (e.g., a customer billing account) with the service provider that is associated with the client device 110. For example, a device identifier received in association with the request may be utilized to identify a customer account associated with the customer device 110. In certain embodiments, the rights management application 164 may communicate with the billing system 125 or another suitable component of the system 100 in order to identify the customer account. For example, the rights management application 164 may communicate the device identifier to the billing system 125, and the billing system 125 may return an account number and/or other information associated with the customer account. As another example, account information and associated customer device information may be accessed or obtained from the billing system 125, and the rights management application 164 may identify the customer account by comparing the device identifier to at least a portion of the obtained information.

Based upon the identification of a customer account, the rights management application 164 may identify one or more users associated with the customer account. For example, the rights management application 164 may identify one or more customers that reside within a single household or that are associated with a business customer. In certain embodiments, the rights management application 164 may communicate with the identity management system 120 or another suitable component of the system 100 in order to identify the customers associated with the identified customer account. For example, the rights management application 164 may communicate a customer account identifier (e.g., a billing account number, a primary account holder name, etc.) to the identity management system 120, and the identity management system 120 may return a list of one or more users associated with the account. As another example, account information and associated user information may be accessed or obtained from the identity management system 120, and the rights management application 164 may identify the users associated with a customer account by comparing information associated with the identified customer account to at least a portion of the obtained information.

According to an aspect of the invention, the rights management application 164 may determine access rights associated with the identified users. For example, access rights for each of the users associated with a customer account may be identified. A wide variety of techniques and/or methods, such as the method 300 described in greater detail below with reference to FIG. 3, may be utilized to determine the access rights associated with the identified users. In certain embodiments, the rights management application 164 may identify one or more rights locker accounts and/or other rights accounts associated with each of the identified users. For example, information associated with rights locker accounts may be obtained from any number of databases, memory devices associated with the arbitration system 105, and/or from one or more other components of the system 100, such as the identity management system 120. Once a rights locker account has been identified, the rights management application 164 may communicate with the rights locker 130 associated with the rights locker account in order to identify or determine a user's access rights in association with the rights locker account. For example, a request for access rights associated with an identified user may be communicated from the rights management application 164 to a relevant rights locker 130, and access rights of the user may be determined based upon a response that is received from the rights locker. Alternatively, access rights for a user and a rights locker account may be determined based upon an analysis of information stored in one or more databases and/or memories accessible by and/or associated with the arbitration system 105. As desired, access rights may be determined for each of the rights locker accounts associated with each of the identified users. In this regard, the rights management application 164 may determine the access rights for the users associated with an identified customer account.

Once the access rights for the one or more users associated with a customer account have been determined, the rights management application 164 may analyze or evaluate the determined access rights in order to determine whether access to the requested content should be permitted. For example, the rights management application 164 may identify the access requirements for the content. As desired in various embodiments of the invention, any number of access requirements and/or access characteristics may be associated with content, including but not limited to, a required access level for accessing the content, a number of times the content may be accessed, a number of times the content may be accessed within a predetermined time period, a duration of time for which the content may be accessed, one or more formatting requirements and/or device capabilities for accessing the content, and/or any other digital rights management options.

Once the access requirements for the content have been identified, the rights management application 164 may determine whether the customer device 110 from which the content request was received is permitted to access the content. For example, the rights management application 164 may determine whether all of the users associated with a customer account are permitted to access the content. If all of the users are permitted to access the content, then the rights management application 164 may approve access of the content by the customer device 110. If, however, at least one user is not permitted to access the content, then the rights management application 164 may identify the user that is utilizing the customer device 110. For example, the rights management application 164 may direct the communication of a request for user identification and/or authentication information (e.g., user name and password, etc.) to the customer device 110 for presentation to the user. Based upon information included in a response to the request for identification and/or authentication information, the rights management application 164 may identify and/or authenticate the user. The rights management application 164 may then determine whether the access rights associated with the user authorize access to the requested content. If the user is permitted to access the content, then the rights management application 164 may approve access of the content by the customer device 110. Otherwise, access to the requested content may be denied.

Additionally, in certain embodiments, the rights management application 164 may determine whether the customer device 110 is capable of and/or permitted to receive the requested content. For example, device requirements for outputting, displaying, and/or rendering the content may be compared to capabilities and/or specifications associated with the customer device 110. As another example, various device restrictions, such as parental control restrictions, may be analyzed or evaluated in order to determine whether the customer device 110 is permitted to receive the requested content. If it is determined that the customer device 110 is permitted to receive the requested content, then the rights management application 164 may approve the content for communication or output to the customer device 110. As desired, if it is determined that the customer device 110 is not capable of and/or permitted to receive the requested content, then an appropriate error message may be generated and communicated to the customer device 110 and/or the requested content may be stored for subsequent access by the user utilizing a different customer device 110.

If it is determined that the user and/or the customer device 110 is permitted to access and receive the requested content, then the rights management application 164 may direct a rights locker 130 and/or associated content provider 135 that maintains the content to communicate the content to the customer device 110. Alternatively, the rights management application 164 may obtain the content from the rights locker 130, content provider 135, and/or another data source (e.g., a memory device associated with the arbitration system 105), and the rights management application 164 may communicate or direct the communication of the content to the customer device 110. In certain embodiments, such as embodiments in which the content is provided to a customer device 110 via a broadband communications system (e.g., a cable system, satellite system, etc.), the content may be provided to one or more storage/streamer systems 140 for incorporation into a broadband signal or broadband data stream and ultimate communication to the customer device 110 (e.g., set-top box).

In certain embodiments of the invention, if no users are permitted access to the requested content or the requesting user is not permitted access to the requested content, then the rights management application 164 may communicate with an appropriate offer management system 145 to facilitate the presentation of an offer to the user to purchase the requested content. For example, the rights management application 164 may communicate an indication of the requested content to the offer management system 145. The offer management system 145 may generate an offer to purchase the desired content and direct the communication of the offer to the customer device 110 via any number of suitable networks. Based upon a received response to the generated offer, the offer management system 145 may determine whether the user has accepted the purchase offer. If a purchase offer has been accepted, then the offer management system 145, the billing system 125, and/or other suitable components of the system 100 may facilitate a purchase transaction of the desired content. A message may then be generated and communicated to an applicable rights locker 130 indicating that the user has purchased the desired content and requesting a modification, update, and/or establishment of access rights to the content for the user. The rights management application 164 may then determine that the user has rights to access the content and, as desired, the rights management application 164 may direct the communication of the content to the customer device 110.

With continued reference to the arbitration system 105, the one or more I/O interfaces 156 may facilitate communication between the arbitration system 105 and one or more input/output devices, for example, one or more user interface devices, such as a display, keypad, mouse, pointing device, control panel, touch screen display, remote control, microphone, speaker, etc., that facilitate user interaction with the arbitration system 105. In this regard, user commands may be received by the arbitration system 105.

The one or more network interfaces 158 may facilitate connection of the arbitration system 105 to one or more suitable networks, for example, a broadband network (e.g., a cable network, satellite network, etc.), a wide area network, the Internet, a local area network, a Wi-Fi enabled network, a Bluetooth enabled network, a cellular network, a telecommunications network, any suitable wired network, any suitable wireless network, etc. In this regard, the arbitration system 105 may receive and/or communicate information to other components of the system 100, such as the session resource management system 115, the identity management system 120, the billing system 125, the rights lockers 130, etc.

With continued reference to FIG. 1, any number of customer devices 110 may be provided. One example of a suitable customer device is a programming processing component and/or software module that is capable of receiving and processing a broadband signal (e.g., a cable signal, satellite signal, etc.) output by a service provider. Examples of suitable programming processing components include, but are not limited to, a set-top box ("STB") (e.g., a cable STB, a digital satellite STB, an Internet Protocol Television STB, etc.), a virtual STB, an embedded STB, etc. In certain embodiments, a programming processing component may be connected to a display device associated with a customer, such as a television. In other embodiments, a programming processing component may be embedded, incorporated into, and/or executed on the display device. For purposes of this disclosure, the customer devices 110 that are capable of processing broadband signals will be referred to as set-top boxes 110. In operation, a STB 110 may receive at least a portion of a broadband data signal that is output by a service provider and convert at least a portion of the received signal into content which is displayed or otherwise output by the display device. As desired, the STB may receive a broadband data signal via any number of suitable networks, such as a cable network that includes any number of optical fibers, coaxial cables, and/or cable drops, a satellite network that includes a suitable satellite dish and/or connecting cables, and/or other suitable networks. Additionally, any number of intermediary devices, such as broadband modems, routers, etc., may be situated between the source of a broadband signal and the programming processing component. According to an aspect of the invention, any number of set-top boxes may be associated with a customer and/or a customer account.

In addition to customer devices that communicate with a service provider head end via a service provider network, a wide variety of other types of customer devices may be utilized by a user to communicate with the arbitration system 105. For example, any number of customer devices that utilize other types of networks, such as mobile devices, personal computers, Web-enabled devices, etc., may be configured to communicate requests for desired content to the arbitration system 105 and/or another component of the system 100 associated with the service provider via any number of suitable networks, such as the Internet, a wide area network, a Wi-Fi network, etc. For example, a request for content may be submitted utilizing any number of suitable Web pages or other graphical user interfaces that are hosted by the service provider.

A customer device 110, such as a STB, may be a suitable processor-driven device that facilitates the receipt, processing, and/or output of a broadband signal, broadband data, and/or other data. Additionally, the customer device 110 may be a suitable processor-driven device that facilitates the receipt of a customer request or command to access desired content, such as desired broadband content (e.g., movies, television shows, etc.), desired analog and/or digital content (e.g., music content, video content, etc.) and/or other desired content. As such, the customer device 110 may include any number of suitable computing devices or other processing components that are configured to execute suitable computer-implemented instructions or computer-executable instructions in order to form a special purpose computer or other particular machine that is operable to facilitate the request of desired content, the receipt of content, and/or the presentation or output of received content.

In operation, a user or customer may utilize a customer device 110 to select or otherwise identify content that the user desires to access. For example, the user may navigate through an electronic program guide ("EPG") that is output by a STB and/or through any number of Web pages and/or graphical user interfaces that are displayed or presented to the user via a customer device 110 or at the direction of a customer device 110. Once a user has selected desired content, the user may utilize one or more input devices associated with the customer device 110, such as a remote control, a touch screen display, a keypad, a microphone, a mouse, a keyboard, etc., to enter a command associated with requesting the desired content. The customer device 110 may be configured to generate an access request associated with the desired content, and the request may be communicated to the arbitration system 105 via any number of suitable networks (e.g., a cable network, a satellite network, the Internet, a cellular network, a Wi-Fi network, etc.).

The customer device 110 may further be configured to receive the desired content and output at least a portion of the content for display to a user. For example, if the arbitration system 105 determines that the customer device 110 is permitted to access the desired content, the desired content may be communicated to the customer device 110 by the storage/streamer system(s) 140 and/or other components of the system 100 via any number of suitable networks. Additionally, as desired, the customer device 110 may be configured to receive requests for user identification and/or authentication information and prompt the user to input the requested information. The customer device 110 may then output entered user identification and/or authentication information for receipt by the arbitration system 105. Additionally, in certain embodiments, the customer device 110 may be configured to receive various purchase offers for desired content, output purchase offers for display or other presentation to a user, receive user commands associated with output purchase offers (e.g., user acceptance, user denial, etc.), and process received user commands in order to direct the communication of a response to a purchase offer to the offer management system 145 and/or the arbitration system 105.

With continued reference to FIG. 1, the session resource management system 115 may be a suitable device, server, and/or component of the system 100 that facilitates the receipt of upstream communications from customer devices 110, such as customer set-top box devices, via a service provider network (e.g., a cable network, satellite network, etc.). As such, the session resource management system 115 may be associated with an underlying service provider, such as a cable service provider, satellite service provider, or other service provider. Similar to other components of the system 100, the session resource management system 115 may be a suitable processor-driven device that is configured to execute computer-readable, computer-implemented, or computer-executable instructions. The execution of suitable computer-implemented instructions by the session resource management system 115 may form a special purpose computer or other particular machine that is operable to facilitate upstream communications with any number of customer devices 110. Although a single session resource management system 115 is illustrated, the operations and/or control of the session resource management system 115 may be distributed among any number of devices, computers, and/or processing components.

In operation, the session resource management system 115 may receive an upstream communication from a customer device 110 via a service provider network, such as a cable network. For example, the session resource management system 115 may receive a request from a customer device 110 to communicate upstream content to a service provider head end. The session resource management system 115 may process the received request and communicate various timing, frequency, and/or protocol parameters to the customer device 110. For example, the session resource management system 115 may instruct the customer device 110 to communicate the upstream content at a particular time utilizing a specified frequency or channel. The session resource management system 115 may receive the upstream communication from the customer device. The session resource management system 115 may analyze the received communication and determine whether the communication includes a request for access to desired content. If the session resource management system 115 determines that a communication includes a request for access to desired content, then the session resource management system 115 may provide the request to access desired content to the arbitration system 105 for processing.

The identity management system 120 may be a suitable device, server, and/or component of the system 100 that facilitates the identification of one or more users associated with a customer account (e.g., a customer billing account) with a service provider. As such, the identity management system 120 may be associated with an underlying service provider, such as a cable service provider, satellite service provider, or other service provider. Similar to other components of the system 100, the identity management system 120 may be a suitable processor-driven device that is configured to execute computer-readable, computer-implemented, or computer-executable instructions. The execution of suitable computer-implemented instructions by the identity management system 120 may form a special purpose computer or other particular machine that is operable to facilitate the identification of one or more users associated with a customer account and/or the identification of one or more rights locker accounts associated with each of the users. Although a single identity management system 120 is illustrated, the operations and/or control of the identity management system 120 may be distributed among any number of devices, computers, and/or processing components.

In operation, the identity management system 120 may receive a request to identify one or more users associated with an identified customer account. For example, the identity management system 120 may receive a request from the arbitration system 105 to identify one or more users associated with a customer account. The identity management system 120 may utilize an identifier of the customer account (e.g., an account number, a portion of an account number, etc.) to access stored user information, such as a database or other data file that includes a listing of users associated with customer accounts. Based at least in part upon the stored user information, the identity management system 120 may identify one or more users associated with a customer account. As desired, the identity management system 120 may additionally identify any number of rights locker accounts associated with the users. The identity management system 120 may communicate user information (e.g., user names, user identification numbers, etc.) and/or rights locker account information (e.g., rights locker account numbers, content providers and/or rights locker systems associated with rights locker accounts, etc.) to the arbitration system 105.

The billing system 125 may be a suitable device, server, and/or component of the system 100 that facilitates the identification of a customer account (e.g., a customer billing account with a service provider) that is associated with a customer device 110. As such, the billing system 125 may be associated with an underlying service provider, such as a cable service provider, satellite service provider, or other service provider. Similar to other components of the system 100, the billing system 125 may be a suitable processor-driven device that is configured to execute computer-readable, computer-implemented, or computer-executable instructions. The execution of suitable computer-implemented instructions by the billing system 125 may form a special purpose computer or other particular machine that is operable to facilitate the identification of a customer account that is associated with a customer device 110. Although a single billing system 125 is illustrated, the operations and/or control of the billing system 125 may be distributed among any number of devices, computers, and/or processing components.

In operation, the billing system 125 may receive a request to identify a customer account that is associated with a customer device 110 from which a request has been received to access desired content. For example, the billing system 125 may receive a request from the arbitration system 105 to identify a customer account associated with a customer device 110. The billing system 125 may utilize an identifier of the customer device 110 (e.g., a device serial number, an IP address, etc.) to access stored customer account information, such as a database or other data file that includes a listing of customer accounts and their associated customer devices. Based at least in part upon the stored customer account information, the billing system 125 may identify a customer account associated with the customer device 110. The billing system 125 may communicate information associated with the identified customer account (e.g., an account number, etc.) to the arbitration system 105.

According to an aspect of the invention, any number of rights lockers 130 or rights locker systems may be utilized in association with embodiments of the invention. A rights locker 130 may be a suitable device, server, and/or other component that facilitates the control of access to content (e.g., broadband content, digital content, etc.) by various users and/or customer devices 110. Each rights locker 130 may be associated with a content provider 135, such as a broadcast entity, pay-per-view entity, digital video production entity, digital music warehouse, etc. A content provider 135 may include any number of suitable devices and/or systems that are configured to maintain and/or output various content. Similar to other components of the system 100, a rights locker 130 and/or a content provider 135 system may each be and/or include any number of suitable processor-driven devices that are configured to execute computer-readable, computer-implemented, or computer-executable instructions. The execution of suitable computer-implemented instructions by rights locker 130 may form a special purpose computer or other particular machine that is operable to facilitate the control of access to content associated with a content provider. Additionally, the execution of suitable computer-implemented instructions by the rights locker 130 may form a special purpose computer or other particular machine that is operable to facilitate the provision of access rights information to the arbitration system 105.

In operation, a rights locker 130 may receive one or more requests from the arbitration system 105 for access rights information associated with rights locker accounts for any number of users having accounts with the rights lockers. A request may include identifying information for the one or more users (e.g., user names, etc.) and/or identifying information for one or more rights locker accounts (e.g., rights locker account numbers, etc.). As desired, a request may additionally include identifying information associated with the desired content. In response to a received request, the rights locker 130 may identify and/or determine access rights for the one or more users, and the rights locker 130 may return information associated with the identified access rights to the arbitration system 105. In certain embodiments, various device requirements and/or parameters for accessing the desired content may also be provided to the arbitration system 105. In this regard, the arbitration system 105 may determine whether access to the requested content should be permitted. Additionally, in certain embodiments, the rights locker 130 may be configured to receive requests to provide desired content to a customer device 110. The rights locker 130 may verify that a user associated with the customer device 110 has permission to access the desired content, and the rights locker 130 may direct the output of the desired content to the customer device 110. For example, the rights locker 130 may obtain the desired content from a content provider 135 system and provide the desired content to a suitable storage/streamer system 140.

The storage/streamer system(s) 140 may include any number of suitable systems, devices, and/or components that are configured to incorporate desired content into a broadband signal (e.g., a cable signal, satellite signal, etc.) that is output by a service provider for receipt by customer devices 110. For example, a storage/streamer system 140 may receive content from a rights locker 130 or content provider 135, and the storage/streamer system 140 may incorporate or direct the incorporation of the desired content into the broadband signal, such as an audio and video stream that is output by a service provider.

The offer management system 145 may be a suitable device, server, and/or component of the system 100 that facilitates the generation of purchase offers for desired content. As such, the offer management system 145 may be associated with an underlying service provider, such as a cable service provider, satellite service provider, or other service provider. Similar to other components of the system 100, the offer management system 145 may be a suitable processor-driven device that is configured to execute computer-readable, computer-implemented, or computer-executable instructions. The execution of suitable computer-implemented instructions by the offer management system 145 may form a special purpose computer or other particular machine that is operable to facilitate the generation of purchase offers for desired content that a user does not have permission to access. Although a single offer management system 145 is illustrated, the operations and/or control of the offer management system 145 may be distributed among any number of devices, computers, and/or processing components.

In operation, the offer management system 145 may receive an indication from the arbitration system 105 that a user does not have permission or rights to access certain desired content. The indication may include information associated with the user, a customer device 110, and/or the desired content. The offer management system 145 may identify purchasing parameters associated with the desired content, such as one or more pricing schemes associated with the desired content. Based upon the identified purchasing parameters, the offer management system 145 may generate one or more purchase offers for the desired content and direct the output of the one or more purchase offers for communication to the customer device 110 and presentation to the user. In the event that a purchase offer is accepted, the offer management system 145 may receive an indication that the offer has been accepted, and the offer management system 145 may facilitate the completion of a purchase transaction for the desired content. For example, the offer management system 145 may direct the billing system 125 to charge a customer account for a purchase amount associated with the offer. The offer management system 145 and/or the billing system 125 may then communicate an indication of the purchase of access rights to the desired content to the arbitration system 105, an applicable rights locker 130, and/or another component of the system 100.

Communications between various components of the system 100 may be facilitated via any number of suitable networks, such as a cable network, a satellite network, and/or other networks that facilitate communications. The networks may include any telecommunication and/or data networks, whether public, private, or a combination thereof, including but not limited to, a local area network, a wide area network, an intranet, the Internet, public switched telephone networks, satellite networks, cable networks, and/or any combination thereof and may be wired and/or wireless.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1.

Operational Overview

Figure 2A:
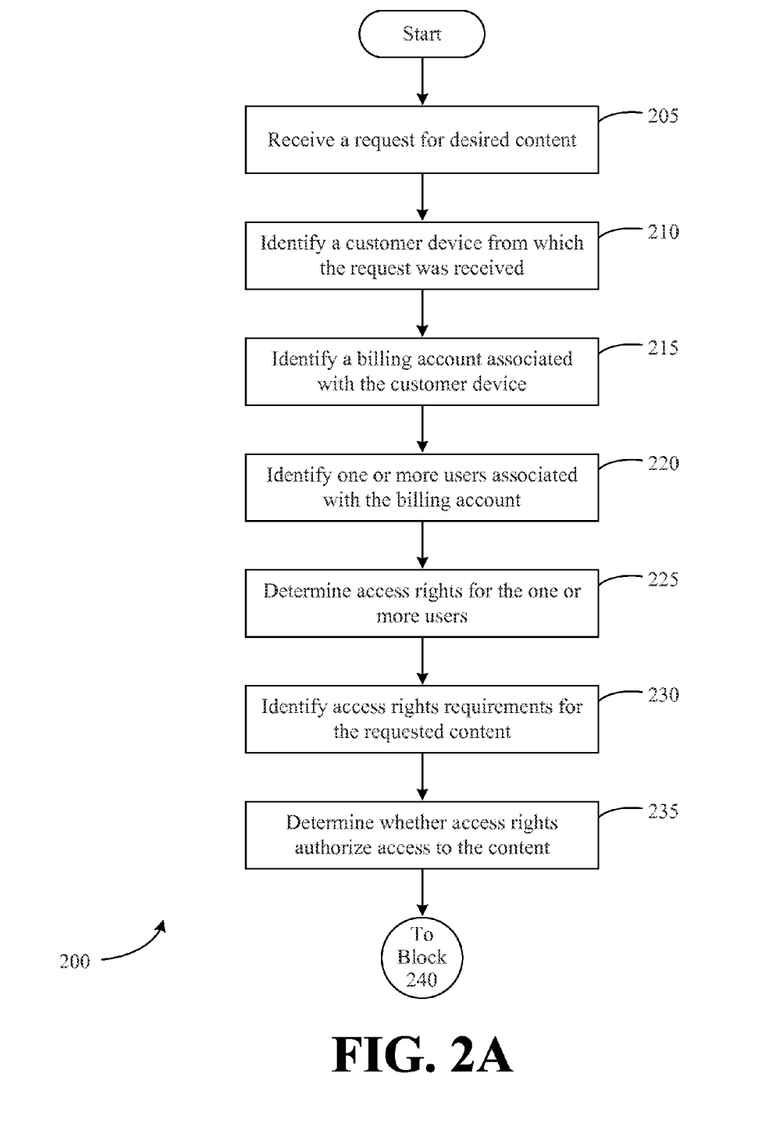
FIGS. 2A and 2B illustrate a flow diagram of an example method for managing rights to broadband content, according to an example embodiment of the invention.
Figure 2B:
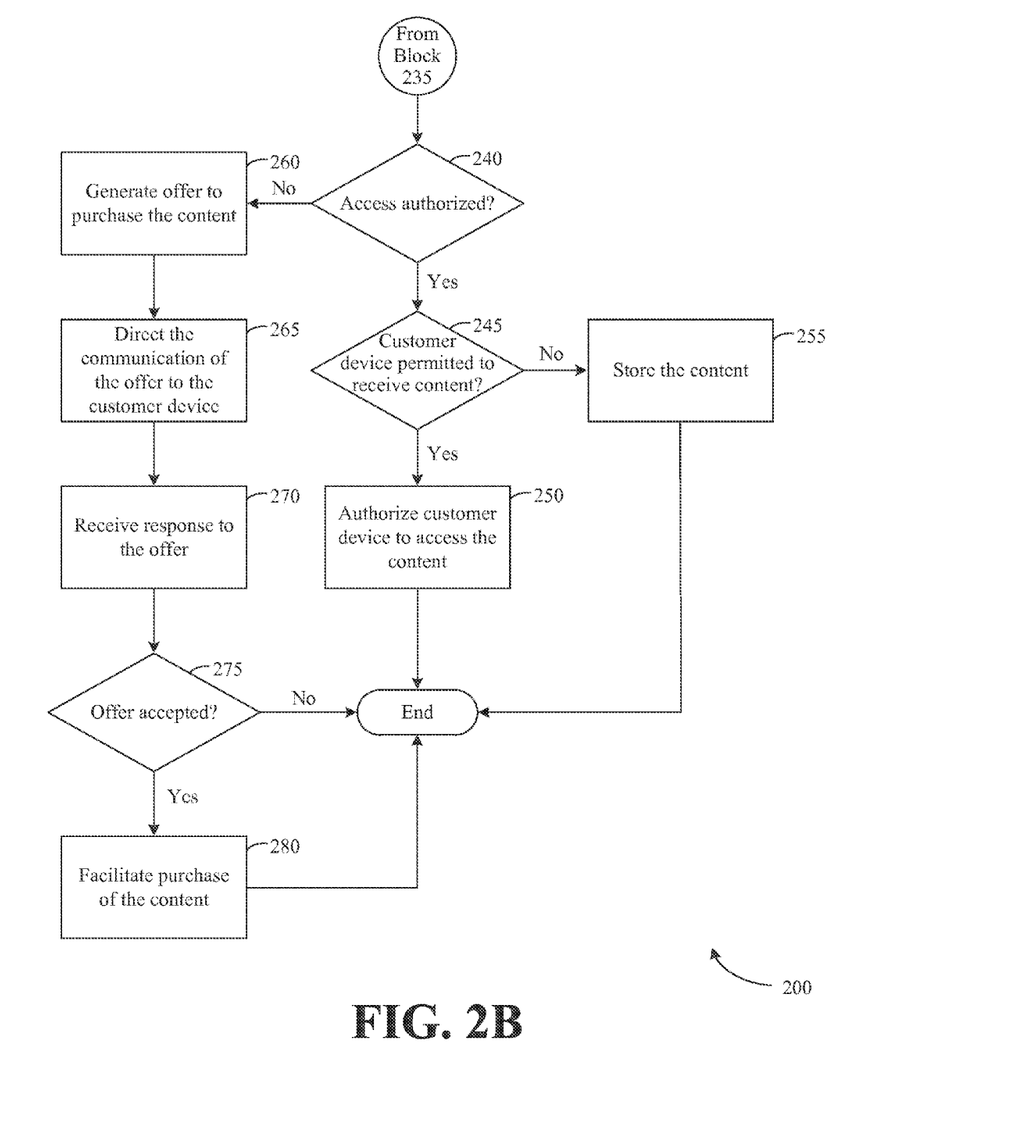

FIGS. 2A and 2B illustrate a flow diagram of an example method 200 for managing rights to broadband content, according to an example embodiment of the invention. The method 200 may be performed by a suitable arbitration server or arbitration system and/or other components of a service provider system, such as the arbitration system 105 illustrated in FIG. 1. The method 200 may begin at block 205.

At block 205, a request for desired content, such as desired broadband digital content (e.g., movie content, television content, other video content, music content, other audio content, etc.), may be received. A request for desired content may be received from a suitable customer device, such as the customer device 110 illustrated in FIG. 1, via any number of suitable networks, such as a broadband network (e.g., cable network, satellite network, etc.), another network provided by a service provider, a wide area network (e.g., the Internet, etc.), a cellular network, a Wi-Fi enabled network, etc. Additionally, the request may include a client identifier (e.g., a client identifier for the customer device, a device serial number, an IP address, etc.) and/or other identification information associated with the customer device 110. The request may also include an identifier of the desired content.

At block 210, a customer device 110 from which the content request was received may be identified. For example, the customer device 110 may be identified based upon a client identifier included in the received content request. At block 215, a billing account associated with the customer device 110 may be identified. For example, the client identifier may be utilized to access a data repository of customer account or billing account information associated with customers of the service provider. A billing account that the customer device 110 is associated with may be identified based upon the access of the stored information. In certain embodiments, a billing system, such as the billing system 125 illustrated in FIG. 1, may be requested and/or directed to identify the billing account associated with the customer device 110. For example, an arbitration system 105 may communicate the client identifier to the billing system 125 along with a request to identify the billing account. The billing system 125 may utilize the client identifier to access and/or search billing account information, and the billing system 125 may return information associated with an identified billing account (e.g., an account number, etc.) to the arbitration system 105. Operations may then continue at block 220.

At block 220, one or more users associated with the identified billing account may be identified or determined. For example, an identifier of the billing account (e.g., a billing account number) may be utilized to access a data repository of user information. One or more users associated with the billing account may be identified based upon the access of the stored information. In certain embodiments, an identity management system, such as the identity management system 120 illustrated in FIG. 1, may be requested and/or directed to identify the users associated with the billing account. For example, an arbitration system 105 may communicate information associated with the billing account (e.g., a billing account number) to the identity management system 120 along with a request to identify the users associated with the billing account. The identity management system 120 may utilize the billing account information to access and/or search stored user information, and the identity management system 120 may return information associated with identified users (e.g., user names, user identifiers, information associated with rights lockers for the users, etc.) to the arbitration system 105. Operations may then continue at block 225.

At block 225, access rights for the identified one or more users may be determined. A wide variety of suitable methods and/or techniques may be utilized as desired to determine access rights for the one or more users. For example, rights locker accounts associated with each of the one or more users may be identified, and access rights for the users with the various rights locker accounts may be determined. One example of the operations that may be utilized to determine access rights for the one or more users is described in greater detail below with reference to FIG. 3.

At block 230, one or more access rights requirements associated with the desired content may be identified or determined. For example, a request for access rights requirements may be communicated to a rights locker that controls access to the desired content, and the one or more access rights requirements may be received in response to the request. As another example, local memory may be accessed and/or searched in order to determine access rights requirements for the desired content. A wide variety of access rights requirements may be associated with content as desired in various embodiments of the invention, including but not limited to, a required access level for accessing the content, a number of times the content may be accessed, a number of times the content may be accessed within a predetermined time period, a duration of time for which the content may be accessed, one or more formatting requirements and/or device capabilities for accessing the content, and/or any other digital rights management options.

At block 235, a determination may be made as to whether the determined user access rights authorize access to the desired content. For example, the determined access rights for the one or more users may be analyzed and/or evaluated. Based upon an evaluation of the user access rights and/or the access requirements for the content, a determination may be made as to whether access to the desired content is authorized or permitted by the user access rights. As desired, any number of access rights for the various users may be taken into account when determining whether user access rights permit access to the desired content. One example of the operations that may be performed in order to determine whether access to the content is authorized is described in greater detail below with reference to FIG. 4.

At block 240, a determination may be made as to whether access to the desired content has been authorized based upon the evaluation performed at block 235. If it is determined at block 240 that access to the desired content has been authorized, then operations may continue at block 245. At block 245, a determination may be made as to whether the customer device 110 from which the content request was received is permitted to and/or capable of receiving the desired content. For example, device requirements for outputting, displaying, and/or rendering the content may be compared to capabilities and/or specifications associated with the customer device 110. As another example, various device restrictions, such as parental control restrictions, may be analyzed or evaluated in order to determine whether the customer device 110 is permitted to receive the requested content. If it is determined at block 245 that the customer device 110 is permitted to receive the requested content, then operations may continue at block 250, and the customer device 110 may be authorized to receive the requested content. As desired, a rights locker and/or content provider may be provided with authentication information for the desired content and directed to output the desired content for receipt by the customer device 110. If, however, it is determined at block 245 that the customer device 110 is not permitted to receive the requested content, then operations may continue at block 255.

At block 255, which may be optional in certain embodiments of the invention, it may be determined that the user is authorized to access the desired content; however, the user is not permitted to access the content utilizing the customer device 110. The desired content may be obtained from a content provider and/or rights locker and stored in one or more suitable memory devices and/or memory locations for subsequent access and/or retrieval by the user. As one example, the desired content may be stored in a memory location associated with the user. The user may utilize another customer device at a subsequent point in time to access the desired content.

If, however, it is determined at block 240 that access to the desired content is not authorized, then operation may either end or optionally continue at block 260. At block 260, one or more offers to purchase the desired content and/or access rights to the desired content may be generated. For example, one or more offers may be generated by a suitable offer management system, such as the offer management system 145 illustrated in FIG. 1. Any number of purchase offers may be generated as desired in various embodiments of the invention, such as purchase offers relating to different levels of access to the content (e.g., purchase of a copy of the content, purchase of the rights to access the content a certain number of times, purchase of the rights to access the content for a certain time period, etc.). At block 265, the one or more generated offers may be communicated to the customer device 110 for presentation to and/or output to the user by the customer device 110. For example, the offer management system 145 and/or the arbitration system 105 may direct a head end component associated with a service provider to communicate the one or more offers to the customer device 110.

At block 270, a response to a purchase offer may be received from the customer device 110. Similar to the request for desired content, the response to a purchase offer may be received via any number of suitable networks and/or communications techniques. At block 275, a determination may be made as to whether an offer has been accepted by the user. If it is determined at block 275 that no offers have been accepted, then operations may end. If, however, it is determined at block 275 that at least one offer has been accepted, then the accepted offer(s) may be identified and operations may continue at block 280. At block 280, a purchase of the desired content and/or access rights to the desired content may be facilitated. For example, a billing system 125 may be instructed to bill the customer billing account for an amount associated with the accepted offer. Once access rights to the desired content have been purchased, the user may be permitted to access the desired content in a similar manner to that described above with respect to blocks 240, 245, 250, and 255.

The method 200 may end following either block 250, 255, 275, or 280.

Figure 3:
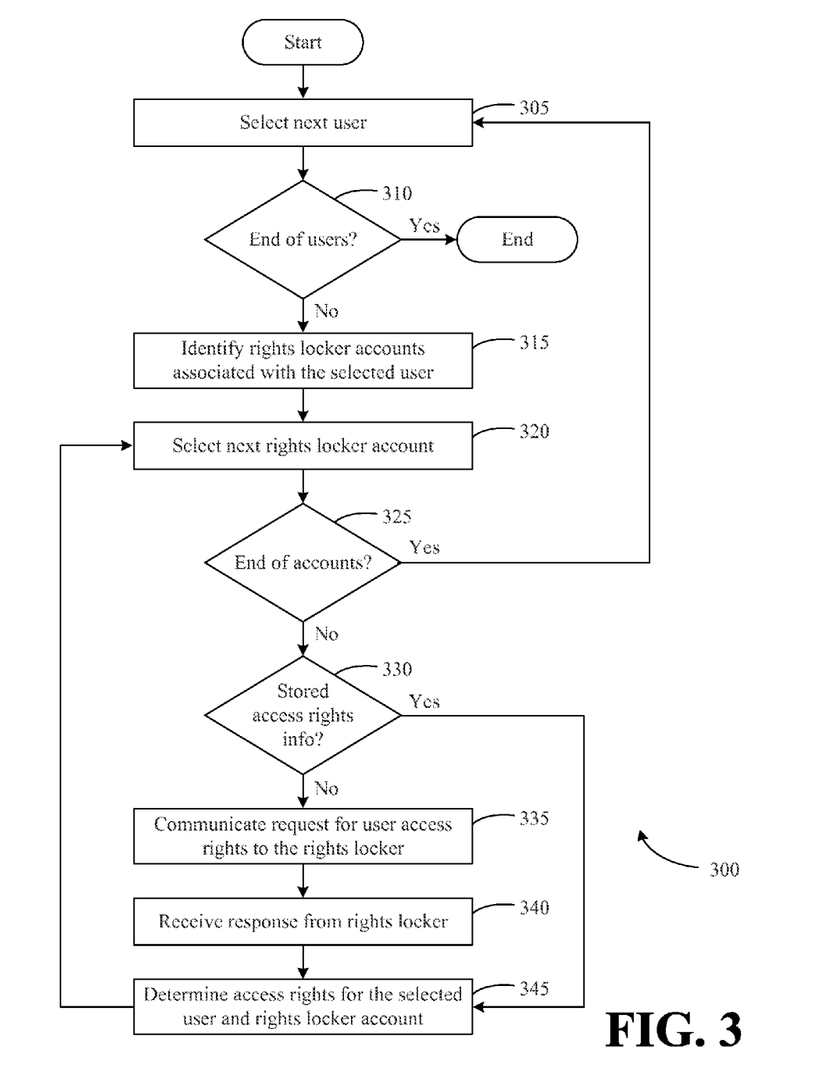
FIG. 3 is a flow diagram of an example method for determining access rights for one or more users that are associated with a billing account, according to an example embodiment of the invention.

FIG. 3 is a flow diagram of an example method 300 for determining access rights for one or more users that are associated with a billing account, according to an example embodiment of the invention. The method 300 may be one example of the operations that may be performed at block 225 illustrated in FIG. 2A. As such, the method 300 may be performed by a suitable arbitration server or arbitration system and/or other components of a service provider system, such as the arbitration system 105 illustrated in FIG. 1. The method 300 may begin at block 305.

At block 305, a next user associated with a customer billing account may be identified and selected. At block 310, a determination may be made as to whether the end of the users associated with the customer billing account has been reached. If it is determined at block 310 that the end of the users has been reached, then operations may end. If, however, it is determined at block 310 that the end of the users has not been reached, then operations may continue at block 315.

At block 315, one or more rights locker accounts associated with the selected user may be identified. For example, information received from an identity management system, such as the identity management system 120 illustrated in FIG. 1, for the user may be utilized to identify one or more rights locker accounts and/or associated rights lockers for the selected user. As another example, stored rights locker account information may be accessed utilizing an identifier for the user (e.g., a user name, user identification number, etc.), and one or more rights locker accounts and/or associated rights lockers may be identified based upon the accessed information.

At block 320, a next rights locker account associated with the selected user may be identified and selected. At block 325, a determination may be made as to whether the end of the rights locker accounts associated with the selected user has been reached. If it is determined at block 325 that the end of the rights locker accounts has been reached, then operations may continue at block 305, and a next user may be selected. If, however, it is determined at block 325 that the end of the rights locker accounts has not been reached, then operations may continue at block 330.

At block 330, a determination may be made as to whether stored access rights information for the user and the selected rights locker account are available for access. For example, a determination may be made as to whether access rights information for the rights locker account is stored in a memory that is accessible by the arbitration system 105. If it is determined at block 330 that stored access rights information is available, then the stored access rights information for the user may be accessed and/or obtained, and operations may continue at block 345 described in greater detail below. If, however, it is determined at block 330 that stored access rights information is not available, then operations may continue at block 335.

At block 335, a rights locker or rights locker system associated with the selected rights locker account, such as the rights locker 130 illustrated in FIG. 1, may be identified. A request for user access rights to the rights locker may be generated and communicated to the rights locker 130 via any number of suitable networks and/or network communication techniques. For example, an identification of the rights locker account (e.g., a rights locker account number) may be communicated to the rights locker 130 along with a request for access rights information associated with the rights locker account and the user. The rights locker 130 may receive and process the request to determine access rights associated with the rights locker account, such as access permission levels, user subscription information, content access rights, content restrictions, etc. The rights locker 130 may then communicate, to the arbitration system 105, a response to the request that includes information associated with the determined access rights. The response from the rights locker 130 may be received at block 340, and operations may continue at block 345.

At block 345, the access rights for the selected user and the selected rights locker account may be determined or identified based upon accessed stored information and/or information received from a suitable rights locker 130 or administrator of the rights locker account. As stated above, a wide variety of different types of access rights may be identified and/or determined as desired in various embodiments of the invention. Operations may then continue at block 320, and a next rights locker account associated with the selected user may be identified and selected for processing.

The method 300 may end following a determination at block 310 that an end of a set of one or more users has been reached and/or that the access rights for the users associated with a customer billing account have been determined. Although the operations of the method 300 are illustrated in FIG. 3 as iterative operations, any number of the operations may be performed in parallel. For example, access rights for multiple users and/or multiple rights locker accounts may be determined in parallel.

Figure 4:
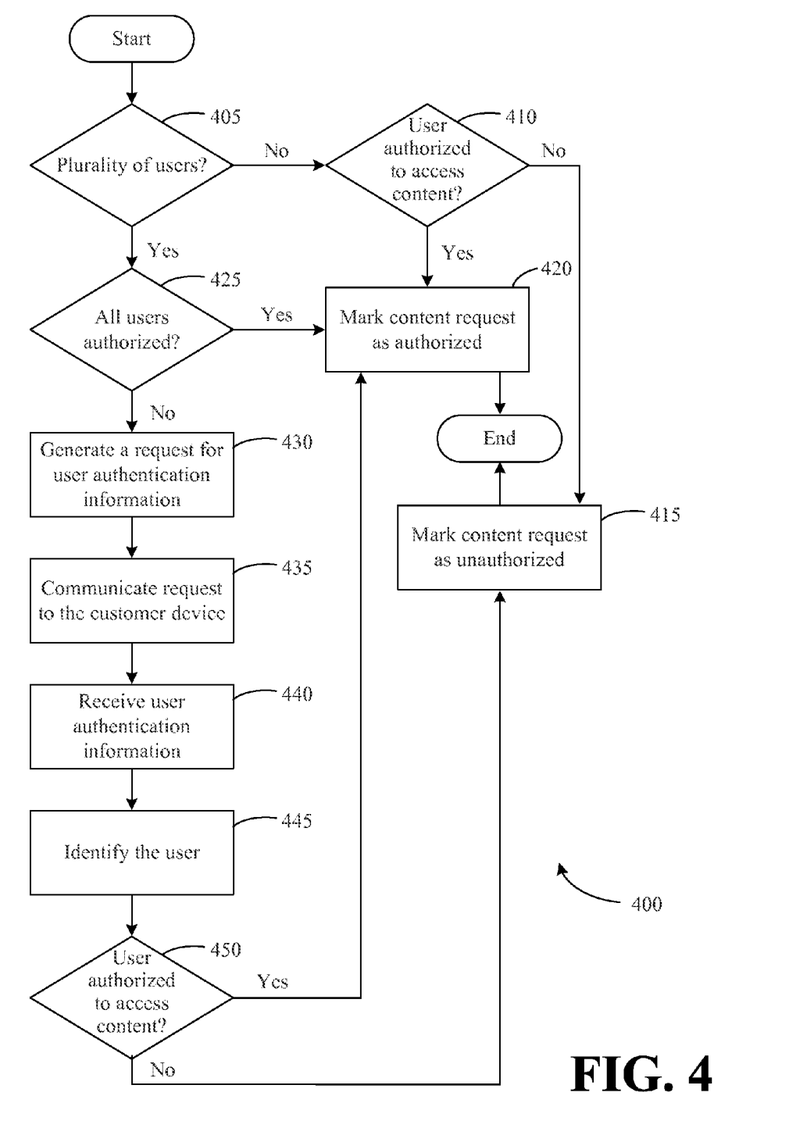
FIG. 4 is a flow diagram of an example method for determining whether access to broadband content is authorized, according to an example embodiment of the invention.

FIG. 4 is a flow diagram of an example method 400 for determining whether access to broadband content is authorized, according to an example embodiment of the invention. The method 400 may be one example of the operations that may be performed at block 235 illustrated in FIG. 2A. As such, the method 400 may be performed by a suitable arbitration server or arbitration system and/or other components of a service provider system, such as the arbitration system 105 illustrated in FIG. 1. The method 400 may begin at block 405.

At block 405, a determination may be made as to whether a plurality of users are associated with a customer billing account. If it is determined at block 405 that only a single user is associated with the customer billing account, then operations may continue at block 410. At block 410, a determination may be made as to whether the user is authorized or permitted to access the desired content. For example, the user access rights for a rights locker account associated with the desired content may be identified. The access requirements or access restrictions associated with the desired content may be compared or otherwise evaluated in light of the identified user access rights. A determination of whether the user is authorized or permitted to access the desired content may then be made based upon the comparison or evaluation.

If it is determined at block 410 that the user is not authorized to access the desired content, then operations may continue at block 415, and the desired content may be marked or identified as unauthorized for access by the user. In other words, the received request for the desired content may be marked as unauthorized or denied. If, however, it is determined at block 410 that the user is authorized to access the desired content, then operations may continue at block 420, and the desired content may be marked or identified as authorized for access by the user. In other words, the received request for the desired content may be marked as authorized or approved.

If, however, it is determined at block 405 that a plurality of users are associated with a customer billing account, then operations may continue at block 425. At block 425, a determination may be made as to whether all of the users associated with the customer billing account are authorized to access the desired content. For example, a determination may be made as to whether universal access to the desired content is authorized by one or more of the rights locker accounts. As another example, a determination may be made as to whether all of the users have rights to access the desired content. If it is determined at block 425 that all of the users associated with the customer billing account are authorized to access the desired content, then operations may continue at block 420 described above. If, however, it is determined at block 425 that not all of the users are authorized to access the desired content and/or that universal access rights are not permitted, then operations may continue at block 430.

At block 430, a request for user identification and/or user authentication information (e.g., a user name, a password, a security code, a security token, etc.) may be generated. The generated request may be communicated to the customer device 110 at block 435. The customer device 110 may receive the request and prompt the user to enter the requested identification and/or authentication information. The customer device 110 may return the requested information to the arbitration system 105, and the requested information may be received at block 440. At block 445, the received user identification and/or authentication information may be evaluated and utilized to identify and/or authenticate the user of the customer device 110. Operations may then continue at block 450.

At block 450, which may be similar to block 410, a determination may be made as to whether the identified user is authorized or permitted to access the desired content. For example, the user access rights for a rights locker account associated with the desired content may be identified. The access requirements or access restrictions associated with the desired content may be compared or otherwise evaluated in light of the identified user access rights. A determination of whether the identified user is authorized or permitted to access the desired content may then be made based upon the comparison or evaluation.

If it is determined at block 450 that the identified user is not authorized to access the desired content, then operations may continue at block 415, and the desired content may be marked or identified as unauthorized for access by the identified user. In other words, the received request for the desired content may be marked as unauthorized or denied. If, however, it is determined at block 450 that the user is authorized to access the desired content, then operations may continue at block 420, and the desired content may be marked or identified as authorized for access by the identified user. In other words, the received request for the desired content may be marked as authorized or approved.

The method 400 may end following either block 415 or 420.

The operations described and shown in the methods 200, 300, and 400 of FIGS. 2A, 2B, 3 and 4 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 2A, 2B, 3, and 4 may be performed.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. At least one computer-readable non-transitory storage medium having instructions encoded thereon that, in response to execution, cause at least one computer processor to perform operations comprising:

receiving a request for content, the request is received from a customer device and comprises a client identifier associated with the customer device;

receiving access rights information from one or more rights locker devices associated with one or more content providers, each of the one or more rights locker devices is external to the at least one computer processor;

identifying a billing account associated with the customer device based at least on the client identifier;

identifying a plurality of users associated with the billing account;

determining a set of one or more access rights based at least on a portion of the access rights information, the set of one or more access rights comprising respective rights for each of the plurality of users; and determining, if access to the content is authorized based at least on the set of one or more access rights.

2. The at least one computer-readable non-transitory storage medium of claim 1, wherein the received request further comprises an identifier of a desired permission level for accessing the content, and wherein determining if access to the content is authorized comprises determining if the set of one or more access rights permits access of the broadband content at the desired permission level.

3. The at least one computer-readable non-transitory storage medium of claim 1, wherein determining a set of one or more access rights comprises:

identifying, for each of the plurality of users, one or more respective rights locker accounts; and determining, for each of the plurality of users, access rights associated with each of the identified one or more respective rights locker accounts.

4. The at least one computer-readable non-transitory storage medium of claim 3, wherein determining access rights associated with each of the identified rights locker accounts comprises:

communicating, via a network to a respective rights locker device included in the one or more external rights locker devices and associated with each of the identified one or more rights locker accounts, at least one request for access rights information associated with the plurality of users;

receiving, in response to the at least one request, the access rights information; and determining the access rights based at least on an analysis of the received access rights information.

5. The at least one computer-readable non-transitory storage medium of claim 3, wherein determining if access to the content is authorized comprises determining that each of the plurality of users is authorized to access the content, and further comprising directing that the customer device be permitted access to the content.

6. The at least one computer-readable non-transitory storage medium of claim 3, wherein determining if access to the content is authorized comprises determining that at least one of the plurality of users is not authorized to access the content, and further comprising:

directing the communication of a request to the customer device for user authentication information;

receiving, in response to the request for user authentication information, the user authentication information; and determining, based at least in part on an analysis of the user authentication information, if the customer device is permitted to access the content.

7. The at least one computer-readable non-transitory storage medium of claim 1, wherein determining if access to the content is authorized comprises determining that access to the content is not authorized, and further comprising directing the communication of an offer to the customer device for purchasing access to the content.

8. The at least one computer-readable non-transitory storage medium of claim 7, further comprising:

receiving an acceptance of the offer from the customer device; and facilitating a purchase of additional rights to the content.

9. The at least one computer-readable non-transitory storage medium of claim 1, wherein receiving a request for content comprises receiving a request from one of a set-top box, a mobile device, a Web-enabled device, or a streaming video client.

10. The at least one computer-readable non-transitory storage medium of claim 1, wherein determining if access to the content is authorized further comprises determining if access to the content is permitted for the customer device.

11. A system, comprising:

at least one memory operable to store computer-executable instructions;

at least one communications interface configured to access the at least one memory and to receive a request for content from a customer device and to receive access rights information from one or more external rights locker devices associated with one or more content providers, the request for content comprising a client identifier associated with the customer device; and at least one processor configured to access the at least one memory and functionally coupled to the at least one communications interface and configured to identify a billing account associated with the customer device based at least on the client identifier, to identify a plurality of users associated with the billing account, and to determine a set of one or more access rights comprising respective rights for each user of the plurality of users based at least in part on the access rights information.

12. The system of claim 11, wherein the at least one processor is further configured to determine if access to the content is authorized based at least on an analysis of the set of one or more access rights.

13. The system of claim 11, wherein the at least one processor is further configured to determine if access to the content is permitted for the customer device and, in response, to determine if access to the content is authorized.

14. The system of claim 11, wherein the request for content further comprises an identifier of a desired permission level for accessing the content, and wherein the at least one processor is further configured to determine if the set of one or more access rights permits access of the content at the desired permission level.

15. The system of claim 11, wherein the at least one processor is further configured to identify one or more respective rights locker accounts for each of the plurality of users, and to determine access rights associated with each of the identified one or more respective rights locker accounts for each of the plurality of users.

16. The system of claim 15, wherein the at least one processor is further configured to direct the at least one communications interface to communicate, via a network, to a respective rights locker device included in the one or more external rights locker devices and associated with each of the identified one or more rights locker accounts, at least one request for access rights information associated with the plurality of users, to receive, via the at least one communications interface, the access rights information in response to the at least one request, and to determine the access rights based at least on an analysis of the access rights information.

17. The system of claim 15, wherein the at least one processor determines, based at least on an analysis of the access rights information, that each of the plurality of users is authorized to access the content, and the at least one processor is further configured to direct that the customer device be permitted access to the content.

18. The system of claim 15, wherein the at least one processor determines, based at least on an analysis of the access rights information, that at least one of the plurality of users is not authorized to access the content, and the at least one processor is further configured to direct the at least one communications interface to communicate a request for user authentication information to the customer device, to receive, via the at least one communications interface in response to the request for user authentication information, the user authentication information, and to determine, based at least in part on an analysis of the user authentication information, if the customer device is permitted to access the content.

19. The system of claim 15, wherein the at least one processor determines, based at least on an analysis of the access rights information, that access to the content is not authorized, and the at least one processor is further configured to direct the communication of an offer to the customer device for purchasing access to the content.

20. The system of claim 19, wherein the at least one processor is further configured to receive an acceptance of the offer from the customer device via the at least one communications interface, and to permit a purchase of additional rights to the content.

* * * * *